Sept. 17, 1963     E. P. G. WRIGHT     3,104,375
INTELLIGENCE STORAGE EQUIPMENT
Filed Aug. 23, 1957                                         10 Sheets-Sheet 4

FIG.4.

Inventor
E. P. G. Wright
By Robert Harding
Attorney

United States Patent Office 3,104,375
Patented Sept. 17, 1963

3,104,375
INTELLIGENCE STORAGE EQUIPMENT
Esmond Philip Goodwin Wright, London, England, assignor to International Standard Electric Corporation, New York, N.Y., a corporation of Delaware
Filed Aug. 23, 1957, Ser. No. 679,935
Claims priority, application Great Britain Aug. 30, 1956
2 Claims. (Cl. 340—172.5)

This invention relates to improvements in or relating to intelligence storage equipment.

According to one aspect of the invention there is provided electric signal transmission equipment comprising signal transmission speed changing equipment, wherein said speed changing equipment comprises an array of "ferric" cells, incoming signal receiving and transferring means for writing successive signal elements received over an incoming signal channel at one speed into successive ferric cells, and signal transmitting means arranged to read said successive "ferric" cells at another speed and to transmit the successive signals read from the said array over an outgoing channel.

According to a second aspect of the invention there is provided equipment for receiving a succession of groups of binary signal elements, in which the signal elements of each said group are received element by element at a predetermined speed as either one or the other of two stable electrical conditions, hereinafter called "1" and "0" conditions, and which comprises an incoming signal channel, signal element detecting means associated with said signal channel for detecting, element by element, which of the two said stable electrical conditions constitute said signal elements, a first set of "ferric" cells in which the conditions of the signal elements of each of the groups of said successive groups are stored element by element, a second set of "ferric" cells each cell of which is complementary to a cell of said first set and in which a first cell rests initially in the "1" condition, scanning means for simultaneously scanning complementary cells of said first and second sets serially once per received signal element, second reading and writing means co-operating with said scanning means for respectively reading the condition of the said second set of cells serially once per scanning cycle, and writing said "1" condition in a different and successive cell of said second set once per scanning cycle, said "1" condition indicating a complementary cell in said first set in which the condition of a signal element received during the following scanning cycle is to be recorded, first reading and writing means co-operating with said scanning means and writing under control of said signal channel examining means for writing the condition of an incoming signal element in a cell of said first set and reading out the conditions in each of the cells of the said first set which have been recorded one per scanning cycle during previous scanning cycles during a single scanning cycle, detector means for determining when the "1" condition in said second set of cells is in the last position in said set, at the beginning of a scanning cycle, and switching means under control of said detector means for causing said first reading and writing means to read out serially.

According to a third aspect of the invention there is provided an electric signal comparator for comparing different groups of signal elements which comprises: a plurality of groups of "ferric" cells, means for writing a plurality of groups of signal elements in said plurality of groups of cells, one group of signal elements per group of cells, means for simultaneously reading each of said different groups of signal elements, element by element, comparing means to which successive sets of said read elements, one per group, are applied and which compares each successive set of elements, and means for indicating identity or lack of identity of said groups of signal elements under control of said comparing means.

According to a fourth aspect of the invention there is provided position indicating equipment for indicating the position in its orbit of a moving member continuously describing the same orbit. The indication is given on a vernier basis having two orders in the respective notations $x$ and $y$. The equipment comprises three sets of ferric cells. The first set represents the vernier scale of the first order, and the other two each represents the vernier scale of the second order. Access switches for said sets of cells are arranged to scan said sets of cells for $y$ times during each complete orbital movement. Reading and writing means are provided for each set of cells for precessing a single "1" condition in a single cell of each set when required, by reading said "1" condition from one cell and writing said "1" condition in the succeeding cell in the direction of scan. First control means is provided for one of said second-order sets of cells and is arranged to cause read-out of said "1" condition during each scanning cycle and re-writing of said "1" condition in the succeeding cell in the direction of scan in the same cycle, whereby the position of said "1" can at any time indicate the position in its orbit of its moving member to be monitored. Second control means for said pair of second order sets of cells is also provided and is arranged to detect coincidence of read-out of the respective "1" conditions in the two sets of cells. Third control means is provided for causing read-out of the "1" condition in said first-order set of cells under control of said second control means whereby a position of a moving member being monitored corresponding to the setting of said first and second order cells is indicated. Fourth control means is provided for causing the "1" condition of said first order sets of cells to be precessed one position in the direction of scan each time it is read. Fifth control means is provided for re-writing said "1" condition in said second-order set of cells, normally into the same cell from which it was read, but alternatively into the next cell in the direction of scan whose associated detector means detects that the "1" condition in the first order set of cells has completed a precessing cycle. And sixth control means is provided for determining when an indication is required that said moving object has reached a given position in its orbit.

With many types of electronic systems the logic control is carried out with the aid of trigger devices which are set by a pulse on a first input wire and reset on a second input wire. With such devices there is no essential need for any sustained input condition in order to maintain a condition and a single pulse is adequate.

If the output from the devices such as distributors, counters, etc., does not have to be sustained, then it is possible to scan the elements of the device seriatim and to choose one or more of the outputs resulting. Furthermore, as the outputs will not coincide, it is possible to have a single output circuit. With such an arrangement it is evidently practical to use extremely simple elements because the single output circuit can amplify and shape the output of the elements to make it suitable for further processing. An example of such a simplified element is provided by square hysteresis loop magnetic material. A single wire threading these elements can lead to the output amplifier.

It must be made clear that these devices do not provide exactly the same facilities as those available with the classical devices.

For example, with a five-way distributor the classical device will be providing a continuous indication on one of five output circuits as to its position. This indication is immediately available, whereas with a common output device the indication appears as a series of pulses and the repetitition rate of the pulses must be sufficiently frequent to allow the processing to function.

In the case where the outputs from two devices cooperate together it becomes a matter of convenience to derive a special signal from the appearance of outputs simultaneously on two or more output circuits.

One example of this coincidence condition arises in the type of scaling circuit in which each device represents a numerical value of increasing orders of significance. When the device of least significance completes a cycle, one step is applied to the device next in order of significance. However, if these devices are served by a common scanning device, the simplest stepping arrangement is provided if the devices of intermediate significance step when there is a coincidence of output with all other devices of less significance. This leads to the following notation: 01, 02, 03, 04, 05, 06, 07, 08, 09, 00, 11, 12, 13, 14, 15, 16, 17, 18, 19, 10, 11, 22, 23, 24, 25, 26, 27, 28, 29, 20, 21, 22, 33, 34, 35, 36, 37, 39, 30, 31, 32, 33, 44, and so on.

On the other hand, these devices with a common output have some advantages which are not available with the classical devices. An output can be associated with two different logical devices which can be caused to function independently provided that they can be so interleaved in time that the output is not required to function for both devices simultaneously.

An application of the invention is now to be described in connection with the processing of telegraph messages wherein such messages are received at a relatively slow rate and transferred via a buffer storage device to some other storage device, such as a magnetic drum, at a considerably faster rate, and with reference to the following drawings in which.

In FIGS. 1 to 5 are described three independent ferroelectric stores constituting the buffer storage device to be described herein, each having a single or double column.

As an example the ferro-electric stores may use a ferrite material having high value of permeability and which can be magnetised so as to be left at either positive or negative remanence, the remanence and saturation values being very similar. Such materials have a substantially rectangular hysteresis loop.

Each of these stores consists of, for example, a number of ferrite blocks having a number of holes therein, the material around each hole forming a "digit" cell. Each block is threaded with a wire which passes through all its holes, this wire being called the "row wire." The blocks are arranged one above the other, each block constituting a row. Another set of wires, called "column wires" are threaded through like holes in the blocks, each wire passing through a number of holes and together constituting a column.

To store intelligence in such a store in which all cells are initially in the "0" condition, it is necessary to apply negative electrical pulses to the wires threading the individual holes in which "1" is to be registered.

As the wires each thread a number of holes, the correct pulse amplitude to change the state of magnetisation of a single cell can only be restricted to that cell by the unique combination of wires threading that cell. The pulses so applied are called "half-write" pulses because they are each of half the amplitude necessary for changing a cell to the "1" condition, and "half-write" pulses on both row and column wires threading a cell must be simultaneously applied.

The co-ordinate array of cells is used for parallel storage; in other words each row is set simultaneously and read simultaneously. Thus in writing in intelligence, a single row wire and a selection of the column wires corresponding to the cells in the row which are to receive a "1" digit have half-write pulses applied simultaneously to them.

To read a row, it is only necessary to use the row wire, as no discrimination between individual cells is required, so that a full read pulse is applied to the row wire only.

It will be seen that by "reading" the condition of a cell, the contents, if in the "1" condition, are destroyed. In many cases it is desirable to re-write the information, either immediately or with a delay. Immediate re-writing is achieved by following the large positive "read" pulse which has been applied over the row wire with a negative half-write pulse and simultaneously applying another half-write pulse over the column wire concerned, the combined magnitude of these two half-write pulses are sufficient to return the cell to its former condition. If such re-writing is required to occur after a delay period, the half-write pulse applied over the column wire is delayed until the appearance of one of a succeeding number of half-write pulses applied over the row wire, when both are applied together to effect the re-writing.

Figure 1:
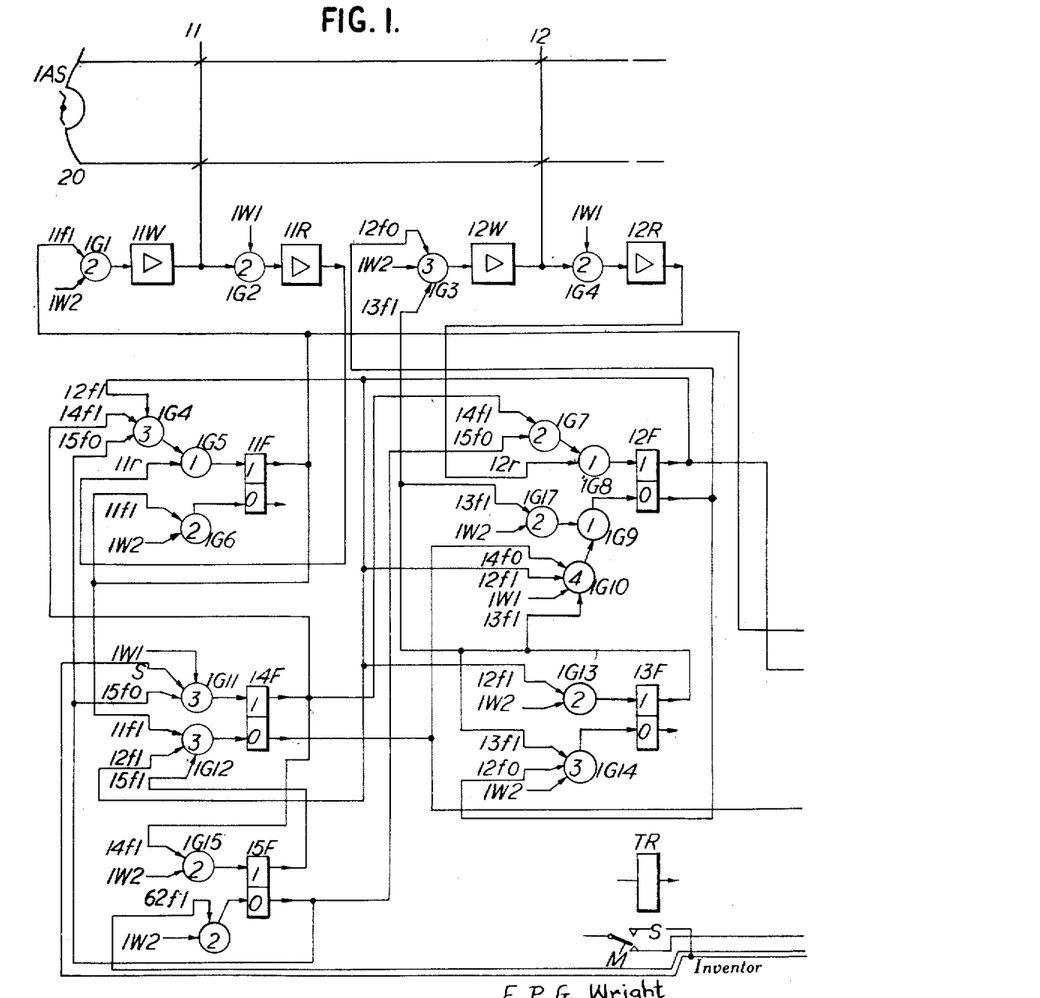
FIG. 1 shows the time scale circuits.
Figure 2:
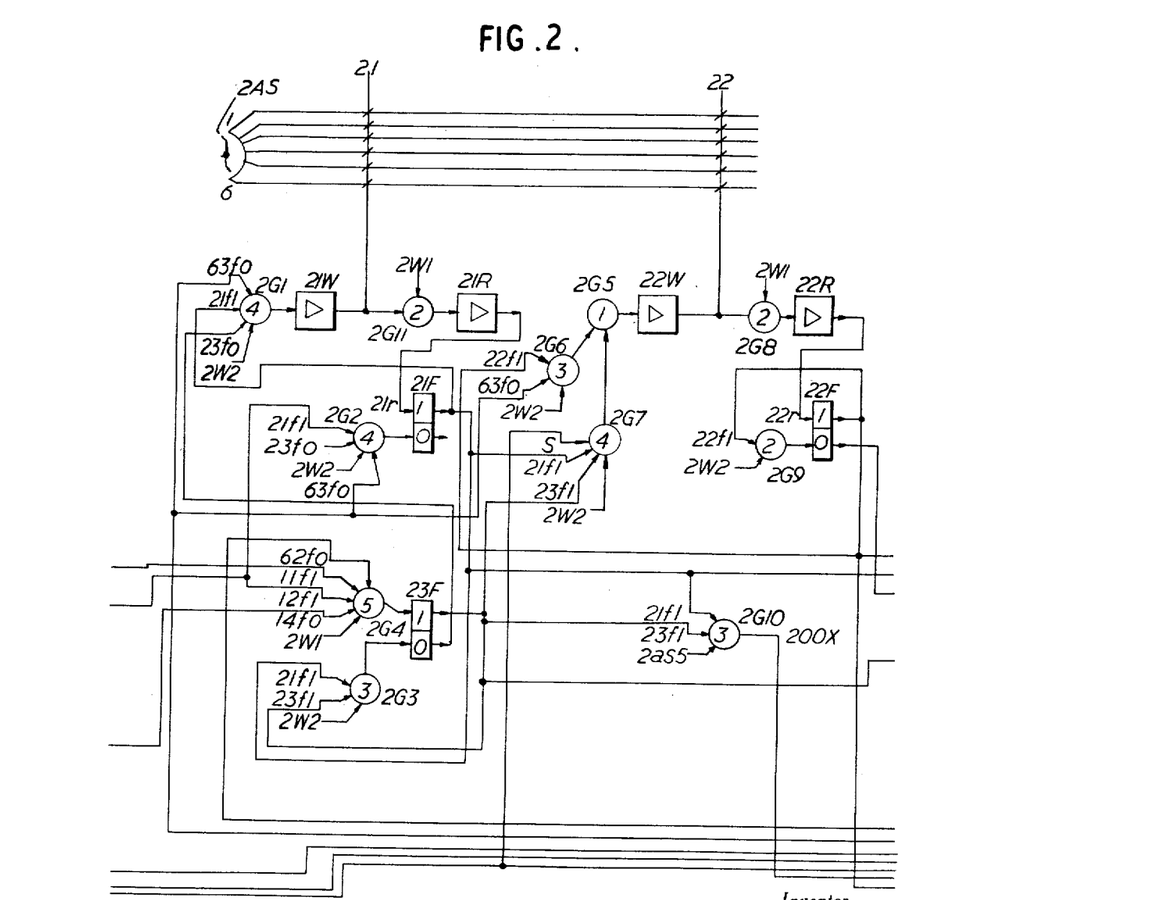
FIG. 2 shows the character register.
Figure 3:
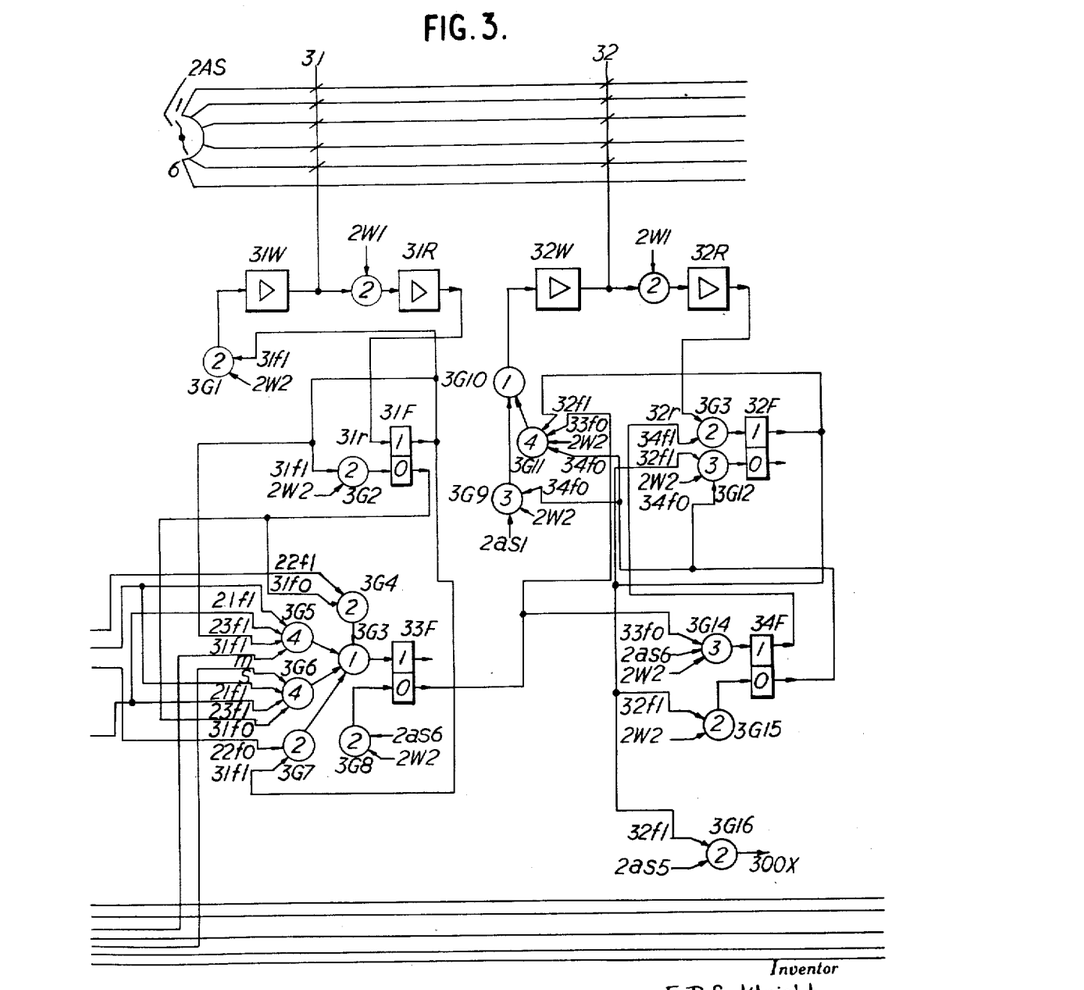
FIG. 3 shows the end-of-message counter.
Figure 4:
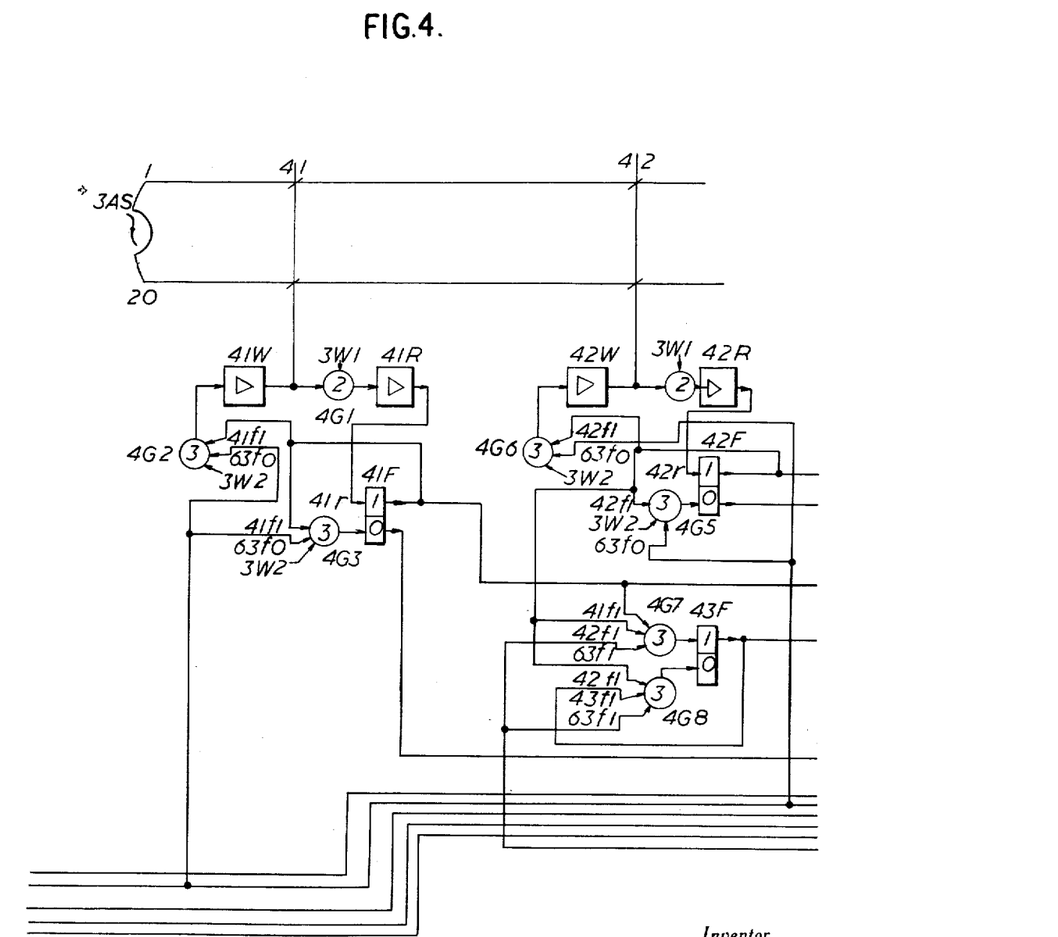
FIG. 4 shows the element distributor unit.
Figure 5:
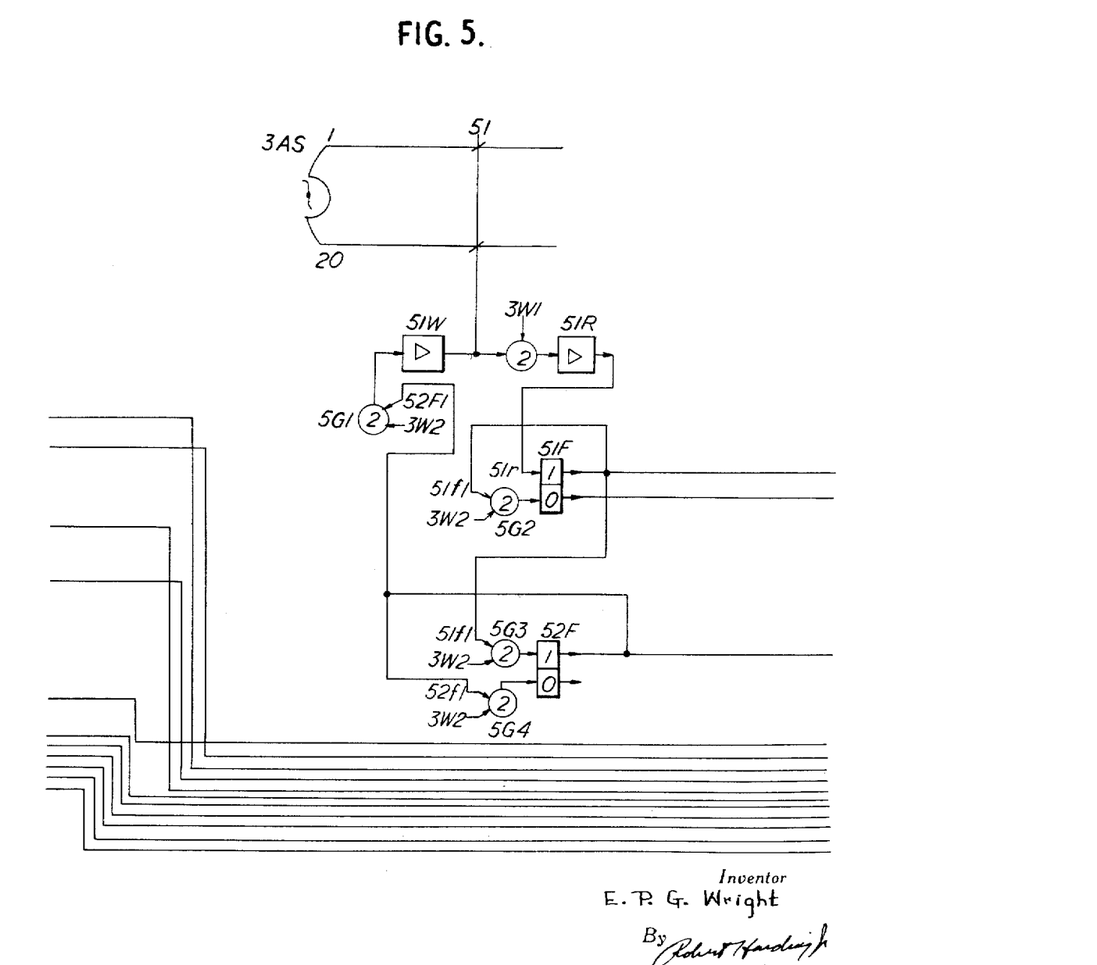
FIG. 5 shows the store indicator unit.

The three independent stores described herein, and as previously stated, constituting the main buffer store as a whole, are each scanned by an access selector, such selectors being designated as 1AS, 2AS and 3AS. 1AS in FIGURE 1, is crystal controlled and provides an accurate time base for examining the telegraph line for a "space" or "mark" condition. 2AS on FIGURES 2 and 3 is driven by, and maintained in phase with, the element repetition rate of the magnetic drum to which the telegraph character elements are to be transferred; 3AS on FIGS. 4 and 5 is also controlled by pulses from the magnetic drum and is adapted to take one step for each character recording position around the periphery of the drum. It is evident therefore that access selectors 2AS and 3AS can be combined.

These three access selectors 1AS, 2AS, and 3AS have corresponding separate "read" pulse waveforms 1W1, 2W1 and 3W1, also "write" waveforms 1W2, 2W2, and 3W2 respectively. These are shown on FIGS. 7, 8, and 9. Although the magnetic drum (FIG. 10) on which final storage of telegraph characters takes place may have a speed that results in data on any track being read by the waveforms at 50 kcs., there can be tolerated a speed variation of plus or minus 5%.

When the drum is rotating, access selector 2AS will be sweeping at 50 kcs., and the six positions on columns 21, 22, 31 and 32 (FIGS. 2 and 3) will require a stepping cycle time of 120 microseconds.

The access selector 3AS, (FIGS. 4 and 5) also driven from the drum, has, as its purpose, the marking of character positions; so that each sixth element position on the drum will indicate a separate character position. Assuming that there are 420 such character positions on the drum, defined by two column circuits, as shown in FIG. 4, each column containing 20 cells, the cycle time for this access selector will be 120×20 microseconds (2.4 milliseconds). The maximum time needed to find a character position will be that needed for 20 cycles of 2AS, i.e. 48 milliseconds. Access selector 1AS shown in FIG. 1 is continuously stepping under crystal control and has a cycle time of 1 millisecond, its scanning frequency is 20 kcs. Each of columns 11 and 12 contain 20 cells which are successively scanned during each cycle. It will be seen later in the specification, that when the time scale indicates an examining time for the centre of each permutable element of a telegraph code character there may be a delay of up to 120 microseconds before an element is stored. When the fifth element is being recorded it is also determined whether an end-of-message character has been received, and, if this is the case it will be recorded in the following sweep of access selector 2AS and the maximum delay in storing will be 240 microseconds.

The inter-character reception period can be measured on the line as commencing at time positions 110 milliseconds of one character to time 30 milliseconds of the next character, which will allow 60 milliseconds as compared with the maximum waiting time of 48 milliseconds. It will be noted that the follow-on character will commence after only 30 milliseconds and at this time columns 11 and 12 of the time scale are required, columns 21 and 22 of the character register are not needed until the 60 millisecond period has elapsed.

Figure 10:
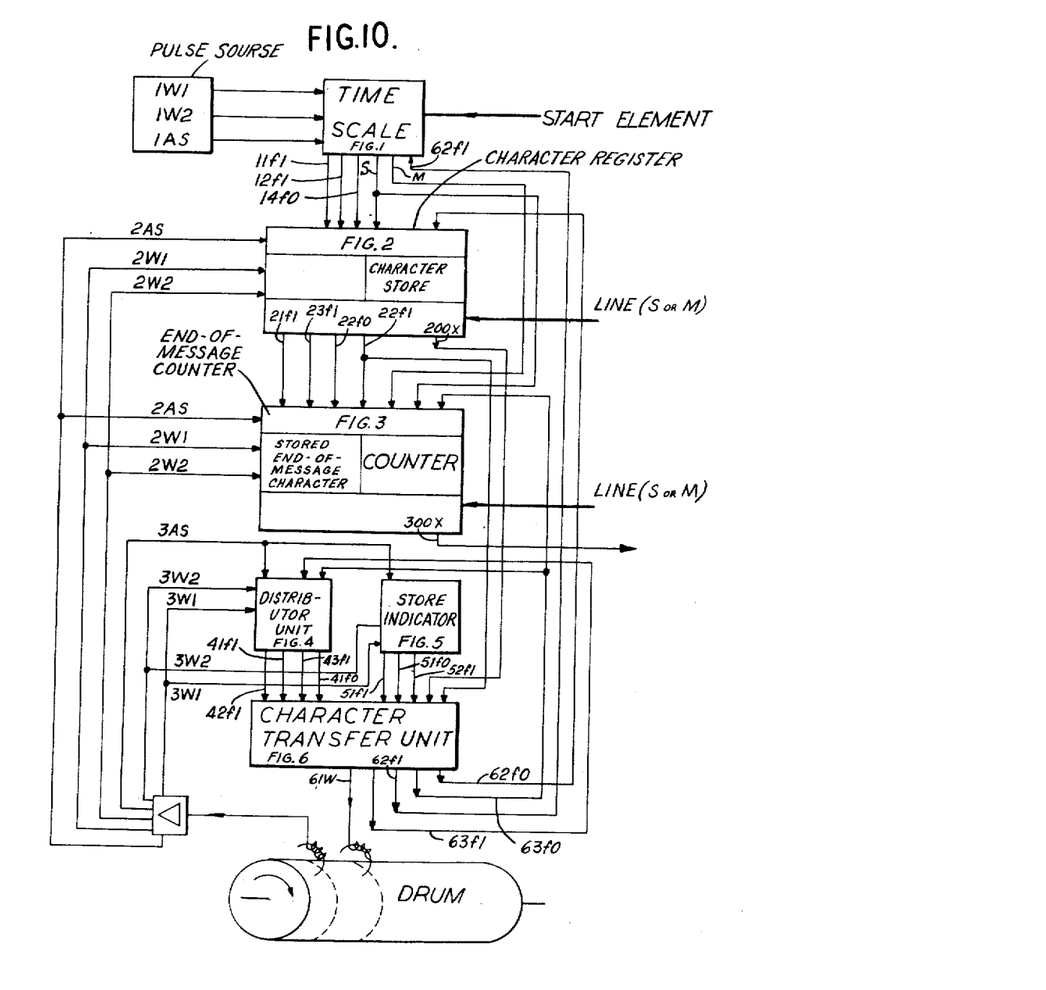
FIG. 10 shows a block schematic diagram of the buffer storage device.

FIG. 10 is a block schematic diagram of the various and separate units which, in combination, comprise the main buffer store, and as related to the magnetic drum.

It will be seen that whereas access selector 1AS is driven separately, access selectors 2AS and 3AS are driven from tracks on the magnetic drum, the stepping cycles and scanning speed of the waveforms being derived from the speed of the drum and permanently magnetised positions equally disposed around the periphery.

The complete cycle of operation of the system, from reception of a start element to the termination of the operation cycle on the receipt of an end-of-message character is now to be briefly described with reference to FIG. 10.

The time scale circuits, which are respective to waveforms 1W1 and 1W2 and the stepping speed of access selector 1AS, generate a series of line examining pulses at 10, 30, 50, 70, 90, 110 and 130 millisecond intervals after reception of a start element of a telegraph character code. The commencement of the start element is considered to take place at zero time of the time scale, and only on receipt of a start element will the time scale circuits become effective to enable the examining pulses to be generated. Such pulses are applied to the telegraph line at the centre of each examining period to determine whether it is in the "space" or "mark" condition, such a condition appearing at the character register circuits to either change, or retain, the condition of a cell, in a single column 5, cell store, the particular cell being indicated by a single column, 5 cell, distributor.

Reception, examination, and storing of 5 elements of a telegraph character in the store causes a signal to be generated on line 200X. This signal when the flip-flop 22F is in condition 22/1, indicates to the character transfer circuits that a character has been fully received, stored, and is awaiting transfer to the drum in the correct sequential recording position on the drum line track. However, no such transfer is made unless the condition of the drum is such that it is in the right position relative to the recording head. The character may be retained in this store until such a condition is indicated in the character transfer circuits.

The character transfer circuits are responsive to the distributor and store indicator circuits which, in combination, examine the condition of the drum storage track, thus maintaining a supervisory control such that the character transfer circuits can only effect a transfer of the character when, as previously stated, the drum is in the correct sequential recording position. The control circuit operated by the signal on line 200X is reset for the receipt of the next character indicating signal as transfer takes place. Resetting of this control circuit prevents any further recording being made until the next character is ready for transfer.

The cycle of receiving, storing and transferring characters takes place until the reception of a series of end-of-message characters. It is the purpose of the end-of-message counter to supervise the telegraph line and the character store for receipt of a series of end-of-message characters by comparing the character appearing in the character store with a permanently stored end-of-message character in a single column, 5 cell store, in the end-of-message counter itself. The appearance of several consecutive end-of-message characters causes a signal to be generated on line 300X. This signal indicates to other circuitry, not shown, that a message has been received in its entirety, and causes transfer of the recorded message from the line track on the drum to some other track, thus leaving the line track vacant for reception of a further message.

*The Time-Scale Circuits*

FIG. 1 is a schematic of the time-scale circuits and shows a means of providing an accurate time base for examining the telegraph line condition for "mark" or "space." It comprises, as already stated, a crystal controlled access selector 1AS scanning the cells in columns 11 and 12 once every millisecond. Each column contains 20 cells and it is the purpose of the cells in column 11 to record the position of access selector 1AS when a telegraph character commences, and the purpose of those in column 12 to determine the scanning instants. Each of columns 11 and 12 has its own associated reading amplifier 11R and 12R, respectively, and each has its own writing amplifier 12W and 12R, respectively. If reference is made to FIG. 8, a time chart of the "read" and "write" occurrences of pulse waveforms 1W1 and 1W2 for access selector 1AS will be seen.

It is the purpose of the time scale circuits to respond to the start of an incoming signal element, i.e., a telegraph character and produce a series of examining pulses, at which the first pulse will be at the centre of the start element. This is so timed as to occur 10 milliseconds after the appearance of the start element, and each subsequent examining pulse will be at the centre of the succeeding character elements; the examining periods will therefore occur at 10, 30, 50, 70, 90, 110 and 130 milliseconds after reception of a start element. To accomplish this when a start element is detected on the telegraph line, a "1" must first be written in a cell of column 11 and again in column 12 after a delay of two steps in the scanning cycle of access selector 1AS. On each subsequent stepping cycle of 1AS, the "1" read in column 11 is re-written without delay in the same cell, but the "1" read in column 12 is delayed and re-written in the same column two steps later on access selector 1AS. Eventually "1" will appear on cells in the same row of columns 11 and 12, the speed of scanning of access selector 1AS and the number of cells per column being such that this coincidence will occur after 10 milliseconds from the appearance of a telegraph character start element, i.e. 10 milliseconds after the original recording of 1 in column 11. When this coincidence occurs, the examining pulse for the start element is generated, and this may be termed the "scanning instant." On each subsequent stepping cycle of access selector 1AS, the delay in writing in column 12 is reduced to 1 step of 1AS; therefore the next and following coincidences causing examining pulses for the permutable elements of the telegraph character will occur at 20 millisecond intervals. Each of these examining pulses define the times at which the line is examined to determine if it is in the "space" or "mark" condition.

Figure 8:
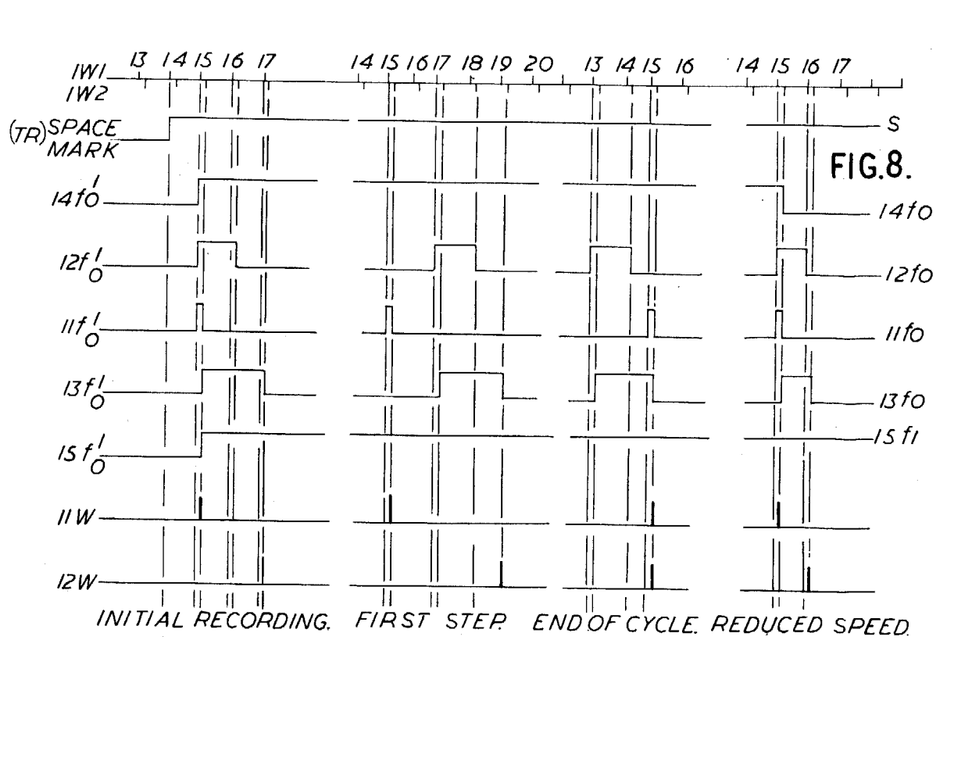
FIG. 8 shows a time scale chart for the time scale circuits.

The operation of these circuits will now be described: it should be noted that triggering operations described herein are effective at the *termination* of the conditions which cause the change in those cases which employ the 1W1 and 1W2 pulses, except those described in FIG. 6. Reference to FIG. 8, which should be studied in conjunction with FIG. 1, shows the cycle of operation of the time scale circuits from the initial recording taking place, when writing in column 12 is delayed by two steps (or two rows) of access selector 1AS, to the end of the cycle of 10 milliseconds when the first coincidence in reading from columns 11 and 12 is noted, followed by the reduction of the delay in writing in column 12 by one step of access selector 1AS.

The first number of a reference designation indicates the figure of the drawing in which the element appears. The W1 and W2 designations relate to the reading and writing control waveforms. Thus 1W1 is a read pulse, and it is followed after a short delay by a half-write pulse 1W2.

This selector 1AS scans the cells in rows 1 to 20 on columns 11 and 12 once every millisecond i.e. 50 microseconds per row. When the telegraph relay TR responds to a start element represented by a "space" condition on the telegraph line, the next 1W1 pulse causes bi-stable register 14F to conduct at 14/1 due to the appearance of the "S" condition signal and 15/0, at gate 1G11 which is therefore opened. 15F is conducting at 15/0 since it is held there by 62/1 from bi-stable register 62F in the character transfer stage and since no pulse has been generated on line 200X which signifies the end of reception of a character. 12/1 is caused to conduct by the appearance of 14/1 and 15/0 and gate 1G7 which opens, and sets 12F to 12F1 via gate 1G8. 12/1, 15/0 and 14/1 cause 11/1 to conduct through their appearance at gate 1G4, which opens, followed by gate 1G5. The 11/1 control of gate 1G1 is energised when pulse 1W2 appears at gate 1G1, causing 1G1 to open and 11W to conduct. "1" is therefore written in column 11 in the cell of the row which 1AS is scanning at that instant. At the same time as this "1" is written, 11F is caused to conduct at 11/0 since 11/1 has appeared at gate 1G6 with a 1W2 pulse. Thus the "space" has caused "1" to be written in column 11. 13F and 15F conduct at 13/1 and 15/1 through 12/1 and 14/1 appearing at gates 1G13 and 1G15, respectively, causing them to open at pulse 1W2. On the following 1W2 pulse 12F conducts at 12/0 through the appearance of 13/1 at gate 1G17 which opens followed by gate 1G9. On the next 1W2 pulse, 12W conducts by the appearance of 12/0 and 13/1 at gate 1G3 and a "1" is written in column 12 two rows later (two steps later of 1AS), than the "1" written in column 11. The 13/1 control also appears at gate 1G14 with 12/0 and on the same 1W2 pulse 1G14 opens causing 13/0 to conduct.

On the next cycle, the "1" registered in column 11 will be read on a 1W1 pulse, causing 11R to conduct via gate 1G2, 11r (the output from 11R) appears at gate 1G5 which opens and causes 11F to conduct at 11/1. On the 1W2 pulse immediately following the 1W1 pulse on which the reading occurred, gate 1G1 is caused to open by the appearance of 11/1. Hence 11W conducts and "1" is re-written in the same cell on column 11 from which it has been read. 11F is restored to 11/0 conducting by the appearance of 11/1 at the same 1W2 pulse at gate 1G6 which opens to reset 11F to 11/0. Since the "1" written in column 12 on the previous cycle of 1AS was recorded two rows later (two steps later of 1AS) this "1" will now be read at the pulse 1W1 for the next but one row from that in which "1" was read in column 11, so 12R conducts. 12r appears at gate 1G8 which opens and causes 12/1 to conduct, and on the following 1W2 pulse appearing at gate 1G13 with 12/1, 13/1 is caused to conduct. 13/1 appears at gates 1G17 at the following 1W2 pulse and 1G17 opens, followed by 1G9, so 12F is reset to 12/0. 13/1 and 12/0 appear at gate 1G3 and on a following 1W2 pulse "1" is re-written in column 12 two rows later (two steps later of 2AS), gate 1G14 opened at the appearance of 12/0 and 13/1 at pulse 1W2 and 13/0 was caused to conduct.

This process of re-writing "1" in the same cell of column 11 from which it came and "1" progressively two steps later in columns 12 for each stepping cycle of access selector 1AS continues until a coincidence in reading "1" from the same rows in columns 11 and 12 occurs. This coincidence occurs after 10 cycles of 1AS, i.e. after 10 milliseconds which is at the centre of the start element which initiated the action which has just been described. This coincidence is noted in the character register and will be decribed later in the specification. This coincidence in reading from columns 11 and 12 causes the time scale circuits to be modified so that the delay in recording in column 12 is reduced to one step of the access selector per cycle of the access selector. It follows therefore that the time of the following coincidences in reading from the same rows of columns 11 and 12 will occur at 20 millisecond intervals instead of 10 (or at every 20 cycles of access selector 1AS); this process will now be described.

Reading simultaneously from columns 11 and 12 causes 11R and 12R to conduct via gates 1G2 and 1G4, respectively on the 1W1 pulse. Therefore 11r and 12r appear at bi-stable registers 11F and 12F which are caused to conduct at 11/1 and 12/1. As usual 11/1 appears at gate 1G1 which opens at pulse 1W2 causing 11W to conduct and "1" to again be re-written in the same cell. 11/1 also appears at gate 1G6, and with pulse 1W2, opens 1G6 and resets 11F to 11F0, meanwhile 12/1 has appeared at gate 1G13 which opens at pulse 1W2 causing 13/1 to conduct. 14/1 has been reset to 14/0 by the appearance of 11/1 and 12/1 together with 15/1 which has remained in that condition since reception of the start element. Since 13F has now been altered, 13/1 appears at gate 1G17 on the following 1W2, so this gate opens followed by gate 1G9 causing 12/0 to conduct. The appearance at gate 1G3 of 12/0 with 13/1, opens this gate on a following 1W2 pulse causing 12W to conduct and "1" to be re-written in column 12. This re-writing is only one row later than the reading. 12/0 and 13/1 appear at the same 1W2 pulse at gate 1G14, and 13/0 is caused to conduct resetting 13F to 13/0. Again the process of writing "1" in the same cell of column 11 and writing "1" in column 12 one row later (one step later of access selector 1AS) continues, until coincidence in reading from the same rows of columns 11 and 12 occurs. Since the delay in each scanning cycle has been halved, the coincidences will continue to occur at 20 millisecond intervals. Each of the coincidences except the first therefore, occurs at the centre of one of the permutable elements of the character whose start element initiated the action. From the appearance of the start element, coincidences therefore occur at 10, 30, 50, 70, 90, 110 and 130 milliseconds. At this stage it should be understood that the character register circuits now to be described are dependent in operation on the examining pulses generated in the time scale circuit.

*The Character Register Circuits*

FIG. 2 shows a schematic of the character store circuits and this store provides a means for storing the telegraph character elements until the necessary supervisory conditions requiring the transfer of the character to the drum present themselves. It comprises an access selector 2AS, driven from and maintained in phase with the element repetition rate of the drum, which scans the cells in columns 21 and 22 once every 120 microseconds. Although 6 rows are shown on columns 21 and 22, only 5 cells appear in each column in rows 1 to 5. The sixth row is blank and is intended to indicate to other circuitry a time commensurate with the termination of the scanning of rows 1 to 6.

Column 21 acts as a distributor for character elements to the cells of column 22 which is acting as a character store. The times at which the line is examined for the character elements are indicated by the coincidence in reading columns 11 and 12 of the time scale circuits.

In the rest conditions a "1" is stored in the first cell of column 21 only, all other cells in both columns being in the "0" condition. The appearance of "1" in column 21 indicates to the character store circuits that the first permutable element of a telegraph character, appearing on a coincidence in reading from columns 11 and 12 of the time scale circuits is to be written in the first cell of column 22. On each stepping cycle of access selector 2AS the "1" read from column 21 is rewritten in the same cell. On appearance of the examining pulse for the first permutable telegraph element, the condition of the element is examined to determine if it is in the "space" or "mark" condition. If it is in the "space" condition, a "1" is caused to be written in the first cell of column 22, if on the other hand it is in the "mark" condition no such recording takes place, thus leaving the cell unaltered. In either case the rewriting in column 21 of the "1" read from that column takes place with a delay of one step of access selector 2AS, so that this "chalk-mark" recording appears in the second cell and not the first, thus indicating to the character register controlling circuit that the next permutable element of the telegraph character is to be stored in the second cell of column 22.

On occurrence of each subsequent examining pulse, a "1" is recorded in the appropriate cell of column 22 as indicated from column 21, but only if the element is in the "space" condition, and as previously stated should it be in the "mark" condition no such recording takes place. Rewriting of "1" in column 21 is of course still delayed by one row (one step of the access selector 2AS). During the reception of a character the "1" recorded in the first cell of column 21, will have moved from the first to the fifth cell, similarly cells 1 to 5 of column 22 will contain the permutable elements of the stored telegraph character. When all permutable elements have been stored in column 22, and when access selector 2AS is at position 2AS5, a pulse is generated on line 200X indicating to the character transfer circuits that a character of five elements is awaiting transfer to the drum. It will be readily understood that from the time of response of the time scale circuits to the start element to the completion of the storage of a character in column 22, a period of 110 milliseconds will have elapsed.

The operation of the character register circuits will now be described, and still with reference to FIG. 2.

As previously stated, in the normal condition with no telegraph signals appearing on the line, access selector 2AS is continuously scanning rows 1 to 6 of columns 21 and 22 every 120 microseconds. The "1" recorded in column 21 is read and rewritten in the same cell of that column, since at pulse 2W1 gate 2G19 opens, 21R conducts and 21r appears at 21F which is caused to conduct at 21f1. 21f1 therefore appears at gate 2G1 with 63f0 and 23f0. 63f0 is in this condition, since it is normally in this state, and is also returned to this state in the character transfer circuits after transfer of a character to the drum. In this instance, however no such transfer has yet been made. Similarly 23f0 is in that condition since no examining pulse has been generated in the time scale circuits. At pulse 2W2, therefore, gate 2G1 opens causing 21W to conduct and "1" is immediately re-written in the cell from which it has been read. This process of reading and writing in the same cell of column 21 continues until the coincidence in reading from both columns 11 and 12 of the time scale circuits causes the examining pulse for the first permutable element, this examining pulse occurring 30 milliseconds after the appearance of the start element. In consequence, 11f1, 12f1, and 14f0 appear at gate 2G4 at pulse 2W1, causing 23f1 to conduct. (When 11f1 and 12f1 were previously conducting 14f0 was not conducting.) If the first permutable element is in the "space" condition, this condition appears at gate 2G7 with 21f1, 23f1, and pulse 2W2, so gate 2G7 opens causing gate 2G5 to open and 22W to conduct and "1" is written in the first cell of column 22. If on the other hand the line is in the "mark" condition, no such recording is made and the first cell in that column remains unaltered, i.e. in the "0" condition.

In the meantime the appearance of 21f1 and 23f1 at gate 2G3 has caused 23f0 to conduct, 21F1 appearing at gate 2G1 with 23f0 and 63f0 at the *following* 2W2 has caused this gate to open. 21W in consequence conducts and a "1" originally read from the first cell of the column is rewritten in the second cell, this indicating that the second permutable telegraph element is to be stored in the second cell of column 22; the appearance of 21f1, 23f0 with 63f0 appearing at gate 2G2 with pulse 2W2 causes 21F to be reset to 21f0.

When the condition in the first cell of column 22 is read; if it is in the "1" condition, 22r appears at 22F which is caused to conduct at 22f1, 22f1 appears at gate 2G6 with 63f0 and pulse 2W2, 2G6 opens followed by gate 2G5 causing 22W to conduct and rewrite "1" in the same cell from which it was read. A "0" condition appearing in that cell would remain unaltered since 22f1 would not conduct since nothing would be read by 22R. The process of rewriting "1" in column 21 with delay of one step of access selector 2AS (or one row) would continue for each scanning cycle of the access selector in which an examining pulse occurs for the remaining permutable elements of the telegraph character, thus indicating in column 22 the appropriate cells for these remaining elements until finally, and at position 2AS5 of the access selector, "1" is read from the fifth cell of column 21. 21f1 is then caused to conduct and appear at gate 2G10 with 23f1 and 2AS5, and hence 2G10 opens and a pulse is generated on line 200X, this pulse indicating to the character transfer circuits that a character is stored ready for transfer to the drum. It should be noted that 23f1 conducts for each cycle of access selector 2AS in which an examining pulse occurs; however gate 2G10 is only operative at position 2AS5 of the access selector 2AS, all other appearances of 23f1 being made at positions 1 to 4.

*The End-of-Message Counter Circuits*

Referring to FIG. 3 which shows a schematic arrangement of the end-of-message counter circuits, the purpose of this counter is to record when a succession of end-of-message characters occur and to cause a signal to be generated on line 300X when a necessary number of these characters have been received.

The counter circuits comprises access selector 2AS, which, as previously explained, is driven and maintained in phase with the character repetition rate of the drum. The rows 1 to 6 of columns 31 and 32 are scanned by the "read" and "write" waveforms 2W1 and 2W2 at 50 kcs., while the stepping cycle of the selector over rows 1 to 6 takes place every 120 microseconds, i.e. 20 microseconds per row.

The elements of an end-of-message character are permanently stored in cells 1 to 5 of column 31 and are continuously "read" and re-recorded in that column without delay for each stepping cycle of access selector 2AS. The circuits concerned with this column are provided to detect an end-of-message character while those associated with column 32 enable counting of sequentially received end-of-message characters. A "1" is normally stored in the first cell of column 32; for each end-of-message character detected by the circuits associated with column 31, the "1" is advanced by one row until eventually after detection of the requisite number of end-of-message characters, the "1" appears in row 5; this appearance resulting in an end-of-message signal being generated on line 300X.

The end-of-message character is detected by comparing the pre-recorded elements in rows 1 to 5 of column 31 with the received permutable elements. The first four elements of a received character are available via column 22 of the character store, while the fifth element is compared at the same time as it is written into cell 5 of column 22, hence the character detector 33F is provided with gates 3G4 and 3G7 to enable comparison of the first four elements received to be made when the stored conditions of these elements are read from column 22. Gates 3G5 and 3G6 enable comparison between the fifth end-of-message character element in column 31 to be made with the last element of a received character. The mode of operation of the character detector 33F is such that only when an end-of-message character is received does 2AS at position 6 find register 33F at 33/0, all other characters causing 33F to be triggered to its "1" condition.

Column 32 circuits maintain a "1" condition in the first cell i.e. the cell in the row energised by 2AS at position 1, unless an end-of-message character has been received; in this case the "1" is advanced on each successive reception. Should any other character be received the counter will be restored to its initial position.

Hereafter a "space" element on the line should be considered as resulting in a "1" condition and a "mark" element as a "0" condition.

The operation of the end-of-message counter circuits will now be described in detail.

The cells in rows 1 to 5 of column 31 and 32 are scanned in phase with those in rows 1 to 5 of columns 21 and 22 and in step, by access selector 2AS, the sixth row, as in the character register, being blank and indicative of the end of a stepping cycle. During each stepping cycle of 2AS, each cell of column 31 is read in turn by 31R, the appearance of 31r at 31F causing 31/1 to conduct for space elements, and it appears at gate 3G1 which opens at pulse 2W2 causing 31W to conduct and to rewrite the end-of-message character element in the same cell. In the case of a "mark" element, i.e. a "0" condition in the cell, 31R would not conduct and thus the cell would remain in the same condition. This process of reading and rewriting, leaving a cell in the same condition, continues whether telegraph characters are being received or not, and as long as access selector 2AS is stepping and scanning the rows of columns 31 and 32.

Consider now a condition where a telegraph character is in the process of reception, and where it is not an end-of-message character. The element conditions being registered in columns 22 of the character store will therefore differ from those registered in column 31, and in these circumstances the character detector 33F will conduct at 33/1 and thus there will be no advancement of the "1" stored in the first cell of column 32. 33/1 conducts through the appearance of 22/1 and 31/0 at gate 3G4; 22/1 is caused to conduct at the character register stage by "1" being read from a cell in column 22 in the row which selector 2AS is scanning; 31/0 is conducting since 31/1 is not conducting due to a "0" condition existing in the complementary cell on column 32 in the row which 2AS is scanning.

Similarly if a "0" condition existed in the cell of column 22 instead of "1," 22/0 would conduct since 22R would not read, 22/0 would appear at gate 3G7 with 31/1, 31/1 conducting since in this instance "1" is being read from column 31, gate 3G7 would open and 33/1 would again be caused to conduct and, as before, since there is no coincidence in reading similarly elements from column 22 and 31, no advancement of the "1" stored in the first cell of column 32 could take place.

Consider now the condition where, on reading the fifth element in column 31, a space condition appears on the telegraph line and at gate 3G6 of the character detector 33F together with conditions 21/1, 23/1 and 31/0. 21/1 is conducting due to a "1" being read from column 21, 23/1 is conducting since this condition is the examining pulse occurring at the centre of the fifth character element, and 31/0 is conducting since a "0" condition is present in the fifth cell of column 31 (i.e. 31R is not conducting). Thus lack of coincidence in reading corresponding character elements from the fifth cell of columns 31 and from the telegraph line causes 33/1 to conduct and again there is no advancement of the "1" stored in the first cell of column 32.

Similarly if a "mark" condition appears on the telegraph line and hence at gate 3G5 with 21/1, 23/1 and 31/1 and "1" is read from the fifth element from column 31, again no advancement of the "1" in column 32 will take place since 31F is caused to conduct at 31/1 due to 31R reading.

It will be seen from the foregoing that all conditions where the state of elements of a received character, differ from those of the pre-recorded end-of-message character in the cells of column 31 have been covered. Such differences result in character detector 31F conducting at 31/1 and preventing 31F1 from conducting and the "1" recorded in column 32 from advancing.

The prime functions of the end-of-message counter circuits are, of course, the generation of the end-of-message signal on line 300X. Operation of these circuits in respect of a series of end-of-message characters appearing on the line will now be described.

Consider now the condition where an end-of-message character is detected. At position 2AS6 of the access selector 2AS, register 33F will be conducting at 33/0, since it has had no opportunity, due to similarity of compared elements, to conduct at 33/1; 33/0 appearing at gate 3G14 at 2AS6 will open it to cause 34F to conduct at 34/1. During the next cycle of access selector 2AS, the "1" condition recorded in the first cell of column 32 will be read by 32R at pulse 2W1 and it will appear with 34/1 at gate 3Ge causing it to open and 32F to conduct at 32/1. 32/1 appears at gate 3G15 on pulse 2W2 to restore 34F to 34/0. On the subsequent 2W2 pulse, 32/1 appearing at gate 3G11 with 33/0 and 34/0 causes it to open followed by 3G10 causing 32W to conduct and thus "1" read from the first cell of column 32 is advanced by 1 row and rewritten in the second cell. It should be noted that in the *previous* writing period, 34F was conducting at 34/1. Thus gate 3G9 was closed as it required 34/0 and pulse 2W2 at position 2AS1 of the access selector to effect rewriting in the same cell via 32W. In this case, rewriting in the first cell of column 32 would have been an undesirable condition since an end-of-message character had been detected. Coincidence with advancing the "1" to the next cell in column 32, gate 3G12 opened to restore 32F to 32/0.

This advance of the "1" in column 32 takes place each time an end-of-message character is detected until "1" is read from cell 5 of column 32 at position 2AS5 of the access selector. A "1" in this cell causes 32R to conduct, and in consequence 32/1 is caused to conduct by the appearance of 32r with 34/1 at gate 3G13. 32/1 appears at gate 3G16 and at position 2AS5 of the access selector, the end-of-message signal is generated on line 300X, indicating to other circuitry (not shown) that such a condition obtains and causes transfer of the recorded message from the line track on the drum to some other track, thus leaving the line track vacant for reception of a further message.

Should any other character than that denoting end-of-message be received at 33F, as has been explained previously, it will be found in a condition where 33/1 is conducting when access selector 2AS is at position 2AS6, and hence 34F will remain at 34/0; in this condition a "1" read from column 32 is ineffective to operate 32/1 via gate 3G3, thus preventing the "1" in the first cell of column 32 from being advanced via gates 3G11 and 3G10. In consequence 34/0 appears at gate 3G9 and "1" is rewritten at position 2AS1 of the access selector and counting must recommence.

This procedure of checking that a number of successive end-of-message characters are received is necessary because the character used as an end-of-message character also has a significance as an ordinary message character. That is, it might occur several times consecutively in a normal message, so the end-of-message character must occur five times to be recognised as such.

*The Distributor, Store Indicator and Character Transfer Units*

Figure 6:
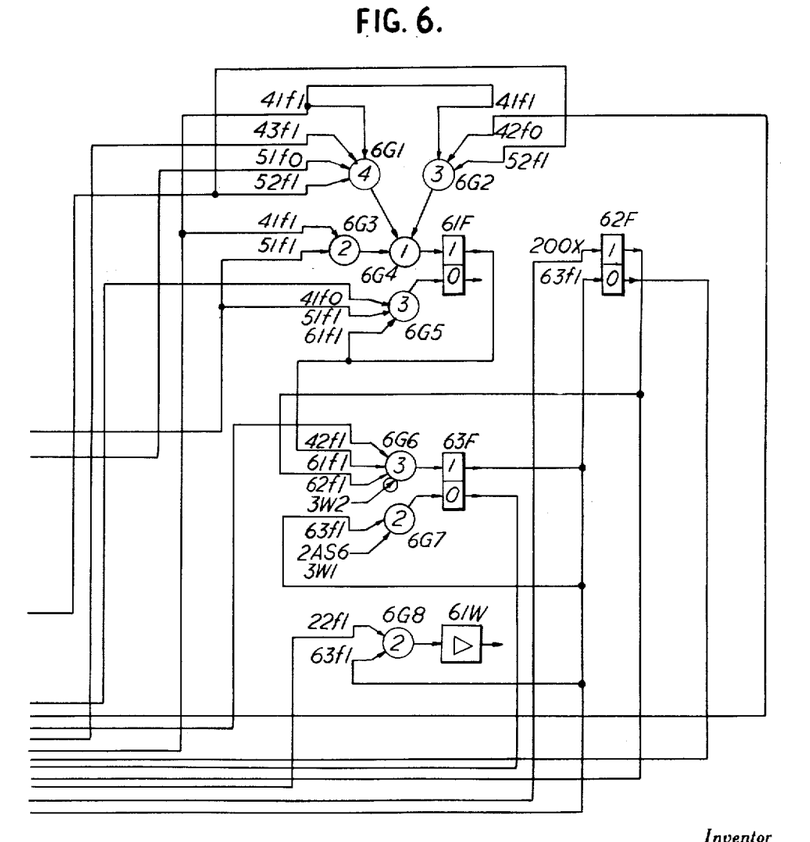
FIG. 6 shows the character transfer unit.

FIGS. 4, 5 and 6 are schematic diagrams of the distributor, store indicator, and character transfer units respectively. In association, they provide a means for effecting transfer of a character from the line circuit to a character position on the magnetic drum in the right position relative to the previously stored character, and at a time when such a character is available for transfer.

The distributor unit, shown in FIG. 4, comprises access selector 3AS which scans the cells of columns 41 and 42 at 50/6 kcs., and takes one step for each of the 420 character positions on the drum.

It is the purpose of columns 41 and 42 to record the next character position on the drum into which any one of a series of characters on the line is to be inserted. The single column circuit of the store indicator unit, shown in FIG. 5, provides an indication in conjunction with the access selector 3AS of the position of the drum so that when the drum is at the right relative position the character can be transferred from the line circuit.

In the normal condition, "1's" read from columns 41 and 42 are re-recorded in the same cells without delay, whereas a "1" read from column 51 is delayed for one row by pulses on each stepping cycle of access selector 3AS. When 41/1 and 51/1 conduct simultaneously, register 61/1 of the character transfer circuits, shown in FIG. 6, is caused to conduct, and when thereafter 42/1 conducts, the drum is in the appropriate position to receive a character. A transfer is not made unless a character has been indicated to be present by a signal on line 200X. If such a transfer can be made however, 63/1 conducts for one cycle of access selector 2AS while the transfer takes place, and as a consequence of 63/0 not conducting, the rewriting in column 42 is delayed by one row. It is to be noted that, unlike the other register, 61F, 62F and 63F are all arranged to conduct at the commencement of the indicated coincidences.

If 41/1 is conducting at the same time as 63/1, rewriting on column 41 will also be delayed by one row in preparation for transfer of the next following character.

Figure 9:
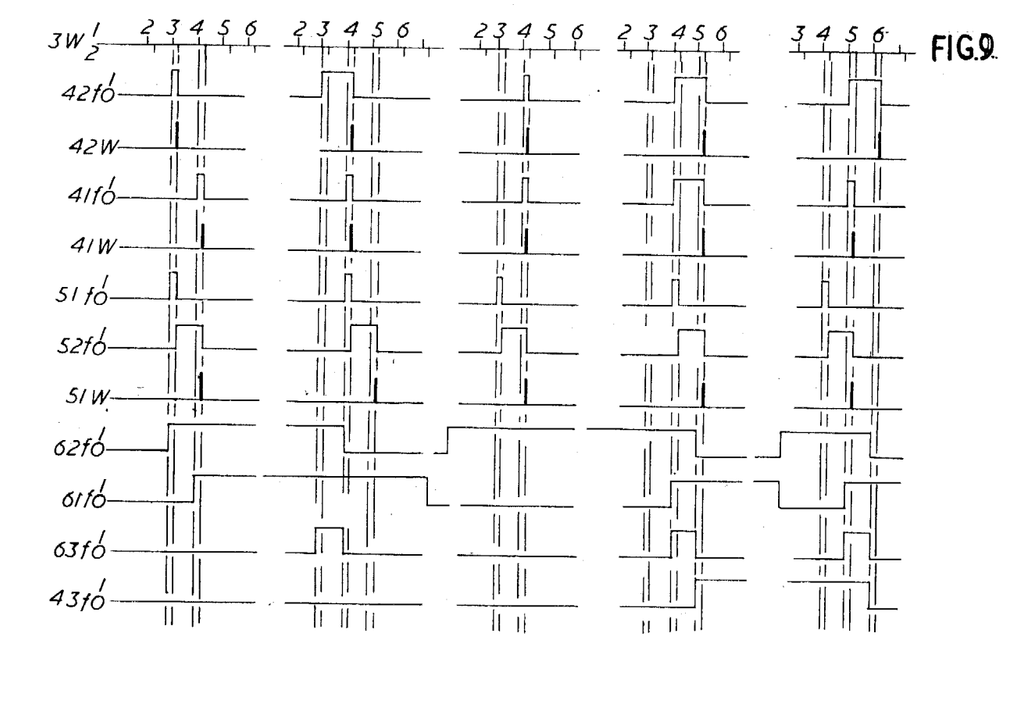
FIG. 9 shows a time-scale chart for the character transfer circuits.

If reference is made to FIG. 9, a time scale of the operation of the units associated with the character transfer operation will be seen.

The operation of these units will now be described with reference to FIGS. 4, 5, 6, and 8:

All bi-stable registers associated with the distributor, store indicator and character transfer units should, in this instance, be considered as resting in the "0" condition. When at a 3W1 pulse, a character stored in column 22 is indicated by a signal on line 200X for transfer to the drum, 62/1 is caused to conduct. Coincidence in reading a "1" from columns 42 and 51 simultaneously causes 42R and 51R to conduct, the appearance of 41r and 51r at registers 42F and 51F respectively causes them to conduct at 42/1 and 51/1. A "1" is immediately rewritten in the same cell of column 42 at pulse 3W2 by the appearance of 42/1 and 63/0 causing gate 4G6 to open and 42W to conduct. Condition 42/1 also appears with 63/0 at gate 4G5 which opens causing 42/0 to conduct, 42/0 appears at gate 6G2 of the character transfer circuits and described later. Condition 51/1 has appeared at gate 5G3 on the same 3W2 pulse causing 52/1 to conduct. It also appears at gate 5G1 causing "1" to be re-written, and at gate 6G2 of the character transfer unit. Meanwhile 51/1 has also appeared at gate 5G2 causing 51F to be reset to 51/0.

When a "1" is next read from column 41, 41R conducts and 41r appears at 41F, which conducts at 41/1, which then appears at gate 6G2 of the character transfer unit 42/0 and 52/1. Gate 6G2 then opens, followed by gate 6G4, causing 61/1 to conduct and appear at gate 6G5. In the meantime 41/1 has appeared at gate 4G2 and 4G3 with 63/0 at pulse 3W2. Therefore, 41W is caused to conduct via gate 4G2 and "1" is re-written without delay in the same cell and 41/0 is caused to conduct via gate 4G3. On this 3W2 pulse, gate 5G1 opens since 52/1 has already appeared as a result of the previous 3W2 pulse, and 51W is caused to conduct and "1" is re-written with a delay of one step of access selector 3AS in the next row in column 51. On the following 3W1 pulse appearing with 52/1 at gate 5G4, 52F is reset to 52/0.

When 42R again reads "1" on an ensuing 3W1 pulse, 42/1 conducts through the appearance of 42r and appears at 6G6 of the character transfer unit with 61/1 and 41/0. Gate 6G6 therefore opens causing 63/1 to conduct. 61/1 appearing at gate 6G5 with 51/1 and 41/0 causes 61/0 to conduct. 63/1 appears at gate 6G8 with 22/1, 22/1 conducting for every character element read in column 22, and 22R conducting. Gate 6G8 opens causing 61W to conduct for one cycle of access selector 2AS whilst transfer of the character to the drum takes place. Re-writing in column 42 is delayed for one step of access selector 2AS since 63F is at 63/1 and 63/0 is required at gate 4G6 with 42/1 to effect rewriting. At 2AS6, i.e. the end of the character transfer cycle of 2AS, gate 6G7 opens since 63/1 has already appeared, and 63F is reset to 63/0. 63/0 appears at gate 4G6 of the distributor and at pulse 3W2 "1" is re-written, with a delay of one step of access selector 2AS, in the next row of column 42. The appearance of 63/1 at 62F also caused 62/0 to conduct, 62/0 is therefore reset for the occurrence of the next signal on line 200X.

While re-writing takes place in column 42 and at pulse 3W2, 41/1 and 51/1 conduct together through "1" being read simultaneously from columns 41 and 51 via 41R and 51R and the appearance of 41r and 51r at registers 41F and 51F. The "1" read from column 41 is re-written in the same cell of column 41 via 41W by the appearance of 41/1 and 63/0 at gate 4G2 at pulse 3W2. 41/1 also appears at gate 4G3 with 63/0 on the same 3W2 pulse and 41/0 is caused to conduct. The appearance of 51/1 at pulse 3W2 at gate 5G2 causes 51/0 to conduct, and 51/1 also appearing at gate 5G3 on the same 3W2 pulse causes 52/1 to conduct. Therefore 52/1 appears at gate 5G1 and on the following 3W2 pulse 51W is caused to conduct and "1" is re-written with a delay of one step of access selector 3AS in the next row of column 51; at the same time 52/0 is caused to conduct by the appearance of 52/1 on the next 3W1 pulse. At a later time 62/1 is caused to conduct by a subsequent signal from line 200X. When 51/1 again conducts on "1" being read from column 51 by 51R at a following 3W1 pulse, 51/1 appears at gates 5G2 and 5G3. On the following 3W2 pulse 52/1 and 51/0 conduct, and so 52/1 appears at gate 5G1, and on a following 3W2 pulse 51W is caused to conduct via gate 5G1 and "1" is re-written with a delay of one step of access selector 3AS in the next row of column 51. 52/0 conducts also at the appearance of 52/1 on the following 3W1 pulse.

As "1" is re-written in column 51, "1" is simultaneously being re-written in columns 41 and 42 through "1" being read in those columns by 41R and 42R on the pulse 3W1 in which 52F was reset to 52/0. Hence 41/1 and 42/1 conduct, 41/1 and 42/1 appearing at gates 4G2 and 4G6 with 63/0, causing re-writing to take place, without delay, in the same cells of columns 41 and 42 at pulse 3W2. Conditions 41/1 and 42/1 also appear at 4G3 and 4G5 with 63/0 causing 41/0 and 42/0 to conduct, therefore no transfer takes place at this time since appropriate position on the drum has not been indicated by the conductance of 51/1. When the next coincidence occurs in reading from columns 41, 42, and 51, through 41R, 42R and 51R conducting, followed by 41/1, 42/1 and 51/1, 41/1 and 51*f*1, 41*f*1 and 51*f*1 appear at gate 6G3 of the character transfer unit which opens followed by gate 6G4 causing 61*f*1 to conduct, and appear at gate 6G6 with 42*f*1 and 62*f*1. In consequence 63*f*1 conducts; meanwhile re-writing in columns 41 and 42 is delayed by one row of those columns since 63*f*0 must appear at gates 4G2 and 4G6 with 41*f*1 and 42*f*1. 4i*f*1, 42*f*1 with 63*f*1 appear at gate 4G7 causing 43*f*1 to conduct; 63*f*1 appears at gate 6G8 and also since the fifth element stored in column 22 of the character register has been read by 22R, causing 22*r* to appear at 22F. 22*f*1 conducts and appears with 63*f*1 at gate 6G8 causing 61W to conduct for 1 cycle of access selector 2AS whilst transfer of the character to the drum takes place. Meanwhile 63*f*0 is caused to conduct by the appearance of 63*f*1 at 2AS6, and appears at gates 4G2 and 4G6 of the distributor at pulse 3W2, causing 41R and 42R to conduct and re-write "1" in the next rows of columns 41 and 42. "1" is re-written in column 51 at the same time, delay in re-writing in column 51 being timed by the operation of 52*f*1 which required 51*f*1 to appear at gate 5G3 at pulse 3W2. 52*f*1 appeared at gate 5G1 and on the following 3W2 pulse gate 5G1 opened causing 51W to conduct; 52*f*1 also appeared at gate 5G4 on the following 3W2 pulse causing 52F to be reset to 52*f*0. 51F was reset to 51*f*0 on the first of the last mentioned 3W2 pulses.

At this stage in the transfer of characters to the drum, registers 61F and 43F are the only two conducting in the "1" condition. When 51R again reads at pulse 3W1 51*r* appears at 51F, 51*f*1 is caused to conduct and appears at gate 6G3 of the character transfer circuit. It also appears at gates 5G2 and 5G3 of registers 51F and 52F respectively. On the following 3W2 pulse, gates 5G2 and 5G3 open and cause 51*f*0 and 52*f*1 to operate. 52*f*1 appears at gate 5G1. On the following 3W1 pulse "1" is read from columns 41 and 42 by 41R and 42R, 41*r* and 42*r* appear at registers 41F and 42F which are caused to conduct at 41*f*1 and 42*f*1 respectively. 41*f*1 and 51*f*1 appearing at gate 6G3 of the character transfer circuit causes that gate to open, followed by gate 6G4 causing 61*f*1 to conduct. Meanwhile 41*f*1 has also appeared at gate 4G2 with 63*f*0 and at the following 3W2 pulse 41W is caused to conduct and re-write "1" in column 41 without delay. Similarly, on the appearance of this 3W2 pulse at gate 5G1 of the store indicator with 52*f*1, 51W is caused to conduct and re-write "1" in column 51, 51W and 41W writing together. When 42*f*1 conducted, it appeared at gate 6G6 of the character transfer circuit wtih 61*f*1 and 62*f*1 (62*f*1 conducting through the appearance of a signal on line 200X indicating a character for storage from column 22), and 63F was caused to conduct at 63*f*1. Re-writing in column 42 is therefore delayed, since 63*f*0 is required at gate 4G6 to effect re-writing in column 42. With 63*f*1 conducting and appearing at gate 6G8 with 22*f*1, 61W is caused to conduct for one cycle of access selector 2AS whilst transfer of the character to the drum takes place. 63*f*1 appears at 62F and 62*f*0 is caused to conduct, 63*f*1 appearing at gate 6G7 with 2AS6 causes 63*f*0 to conduct, "1" is now re-written in column 42 by 42W with a delay, by the appearance at gate 4G6 of 63*f*0 with 42*f*1 at pulse 3W2. Similarly 42*f*0 is caused to conduct by the appearance of similar conditions at gate 4G5. Condition 42*f*1 appearing at gate 4G8 with 43*f*1 and 63*f*1 causes 43F to be reset to 43*f*0.

The actions of the circuits described in the foregoing can be summarized as follows:

The recordings in the two column circuits 41 and 42 together identify the position on the drum in which the next character to be transferred is to be recorded. Column 41 records a "twenties" indication and column 42 a "units" indication. On each cycle of the access selector, the "1" recorded in column 51 is delayed by one step, and so on. In each cycle the position of the "1" in this column corresponds to a different twenty position. The synchronisation between the drum and access selector is such that the positions at which "1" is read during a cycle identify the set of storage positions which commence to pass the recording head when that "1" is read.

The output read from columns 41 and 51 are compared and it will be seen that when "1" is read from both of these columns, the set of storage positions commencing to be in operative relation with the head is that including the next to be used. The coincidence is therefore noted, this being effected by setting 61F to 61*f*1.

The access selector timing is such that the next time "1" is read from column 42 after such a coincidence, the next available storage position is about to pass under the head. Hence a character can be transferred if one is indicated on the line.

Thus the coincidence of 61F at 61*f*1, of "1" read from column 42, and at a signal indicating that a character is ready for transfer causes that character to be transferred to the head, and hence recorded in the next available position on the track.

Since a position on the drum track has been used, the recording of "1" in column 42 is delayed by one step, so as to indicate (with "1" in column 41) the *next* position to be used. It will be obvious that when "1" has been delayed 20 times in column 42, "carry" to column 41 is called for, and this is in fact effected. Thus each transfer alters the recorded identity at the next free character storage position on the drum track. The "1" read from column 51 is, of course, being delayed by one step per cycle at the access selector throughout the operation.

It will be readily seen that equipment could be provided for indicating single storage positions on a drum or other storage equipment serially. In such an equipment two columns or sets of "ferric" cells, each having its associated and individual reading, writing, and individual and common control equipment would suffice. Each "1" condition stored in each of the cells of the first set would indicate a different storage position in the storage equipment, a "1" condition stored in one cell of a second set having a number of cells equal to the storage positions in the first set would indicate a particular storage position in the drum. The cells in the first and second sets would be scanned row by row in synchronism with the storage position repetition rate of the drum and the conditions in each cell read serially. Since all the cells in the first set are in the "1" condition, such a condition would be re-written without delay in the cell. The cell with a "1" condition written therein in the second set and indicating a particular drum storage position would be read at the same time as a complementary cell in the first set, and thus coincidence in reading a "1" from complementary cells in both sets together would indicate a particular storage position, and such an indication could be given by the appearance of the two read conditions at an indicating means, such as a bistable register. The "1" in the second set would be re-written with a delay of one cell. Thus coincidence in reading in the next scanning cycle would indicate a successive storage position and so on.

If it was required to indicate any particular position on a drum without the necessity of reading each position serially, the same equipment such as that just described, could be used. In such an equipment it would be arranged that during one scanning cycle, when the "1" condition of the cells of the first set were being read and re-written without delay, the "1" condition would be written into a chosen cell of the second set at the same time that re-writing of a condition read from a complementary cell in the first set took place. On the next scanning cycle, coincidence in reading a "1" condition from those complementary cells would indicate the predetermined storage position. Thus in successive scanning cycles the predetermined position would be marked and read alternately.

Column Amalgamation

It will be seen that columns 21 and 41 can be combined with an access selector which sweeps with the following sequence.

```
3AS 1
─────
2AS 1
2AS 2
2AS 3
2AS 4
2AS 5
3AS 2
─────
2AS 1
2AS 2
2AS 3
2AS 4
2AS 5
3AS 3
─────
2AS 1
etc.
```

Discrimination can be effected by waveforms 2W2 and 3W2 to distinguish the 2AS time positions from the 3AS time positions, and as a consequence a single column circuit, complete with reading, staticising and writing features, can serve both purposes.

The access selector to carry out this dual purpose can contain a six-way counter and also a two co-ordinate movement. Each cycle of the counter will cause the two co-ordinate movement to make a step forward. In each of the first five counter positions, the 2AS rows are scanned, while in the sixth position, the 3AS row, indicated by the co-ordinate movement, will be scanned.

A corresponding arrangement can be made for columns 22 and 42 using the same discriminating waveforms.

Figure 7:
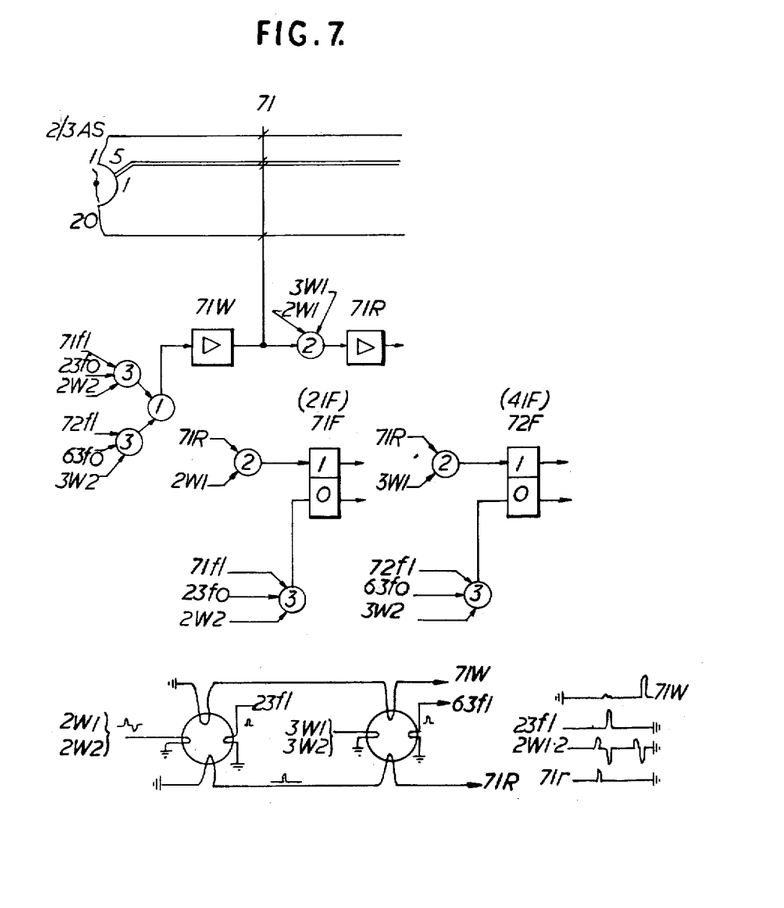
FIG. 7 shows a composite column circuit.

A composite column circuit for columns 21 and 41 is shown in FIG. 7. For the sake of clarity, registers 21F and 41F are represented by registers 71F and 72F respectively; although due to the discriminating waveforms 2W2 and 3W2, only 71F would be required to perform the function of both gates in actual practice. The symbols used for trigger devices coincidence and mixing gates can represent many possible solutions. For example, the registers 71F and 72F, and the gates actuating 71W and shown in the upper part of the diagram may be ferrite cores. Two cores each with four windings shown in the lower part of the diagram may be arranged such that one winding on both cores provides a half-write condition when a "1" is read by 71R. The second winding on each is connected to the read-write waveforms the first core being connected to 2W1 and 2W2 with 2W1 providing a half-write pulse aiding the first winding, whereas 3W1 and 3W2 act similarly on the second core. The third winding is connected to a write pulse derived from 23f1 which when present will balance the read pulse 2W2. The control winding on the second core is connected to 63f1. The fourth winding common to both cores provides an output at the time 2W2 or 3W2 when one or other of the cores is restored to normal. It will be understood that if the control offsets the first restoring pulse, the core may be restored on the following cycle by 2W2 or 3W2 when the control is no longer present. As a consequence, the functional operation of columns 21 and 41 are carried out, as in the functional diagram.

The description herein has shown that the characters are assembled one by one on column No. 22 and transferred from there to the drum. If the access selector 2AS is doubled in capacity from 6 positions to 12 positions, then the column No. 22 will have capacity for two characters and these will be indicated alternately by column No. 21 without any re-arrangement of the control circuits. With this alteration the access selector 3AS can be reduced from indicating 420 character positions to 210 pairs of character positions. This reduced capacity can be achieved by providing 3AS with 14 instead of 20 positions. It happens that the saving on 3AS is equal to the addition on 2AS. If these are combined, as shown in FIG. 7, then the two groups forming 2AS will appear between the positions representing 3AS. The addition of a trigger to FIG. 4 will record whether the odd or even position is the next to take a digit. So long as the character positions on the drum are even in number, the odd and even positions on column No. 22 will remain in phase.

The immediate advantage of the arrangement is that an incoming line can be operated at 100 bauds without requiring the drum speed to be increased. Also on the transmitting side there is a corresponding interest in having the next character available in good time.

The effect of the change on columns No. 31 and 32 is that the end-of-message character must be written twice, or if there are two characters, they can alternate. The increased capacity makes it easier to count the end-of-message indicator. This demands a larger number of consecutive characters.

Columns No. 11 and 12 describe a time scale in which the line circuit requires two columns. An alternative arrangement would be to provide 8 columns and to arrange different lines on each row. If the access selector, 1AS, is driven at 100 kcs., it would be possible to provide 20 rows and yet provide a scanning pulse to each row once every 200 microseconds.

When a character appears, the condition is stored until the next scanning pulse arrives at which time a "1" is written on column No. 1. On the next revolution the "1" is transferred to column No. 2 and so on, the columns acting as binary adders. By suitable choice of the crystal driving the access selector it can be arranged that a pulse arrives on column No. 7 at the end of 10 milliseconds and this is a means for determining the subsequent examining periods. The completion of the character is determined by column No. 21 and this can cause all recordings on the columns 1–7 to be cancelled.

It will be appreciated that with this rearrangement the columns per line are reduced from two to approximately half, but, on the other hand, there is no economy on less than five circuits. Furthermore, this arrangement is slightly more complicated as the line comprises some individual equipment and some common equipment, so that a certain amount of distribution is required by time division.

In the foregoing descriptions only a simple embodiment has been illustrated.

Another possible arrangement is to take the arrangement described for FIG. 1 and to multiply the capacity of 1AS by four. Instead of 1W1 and 1W2 being the read and write pulse for every position, waveforms 1W1, 1W3, 1W5 and 1W7 are the read pulses for four consecutive positions and 1W2, 1W4, 1W6 and 1W8 are the corresponding write waveforms. Four lines, each associated with different pairs of waveforms can now be associated with columns No. 11 and 12 and the ratchet error is not changed if the speed of the access selector is also multiplied by four times. This arrangement has line circuits with an average of half a column and the only disadvantage is the increased cost of the access selector which is small in any case if it serves many groups of columns.

Some further economy is possible by interleaving on the principle shown in FIG. 7. If the rows are scanned in the order 1, 2, 3, 4, 5; 1, 2, 3, 4, 6 it is possible to maintain a progression with six rows which provides a cycle time equal to tens rows swept in a regular cycle. If the unit time is 0.2 millisecond and the cycle time is 2 milliseconds, then the scanning time moving one step per cycle is approximately 20 milliseconds.

If four line circuits are grouped together, the sequence will be 1A, 1B, 1C, 1D, 2A, 2B, 2C, 2D, etc. In order to maintain the overall time, the selector must now be driven four times as fast. For the optimum use of a column, the size of the repeated sub-cycle (1-4) should be as nearly as possible equal to the markers (5 and 6).

With a column 11 arranged as described, the start element will cause a mark to be made by the following write pulse which may be any value 1-6. If it is one of the values 1-4 a mark will also be made by the following 5 or 6 pulse. Coincidence between columns 11 and 12 must occur on the appropriate sub-cycle, and for this reason the control circuit must "look" both at the markers (5 and 6) and the sub-cycle indicator and "remember" the condition between the two events. Column 12 would be arranged the same way. The advantage of row reduction is to allow an increased quantity of line circuits to a column. With the ordinary arrangement, 10 rows serve one circuit; with interleaving, 6 are sufficient. Twenty rows normal are equal to 8 rows interleaved.

While the principles of the invention have been described above in connection with specific embodiments, and particular modifications thereof, it is to be clearly understood that this description is made only by way of example and not as a limitation on the scope of the invention.

What I claim is:

1. Electric signal transmission equipment wherein signal transmission speeds are changed comprising an incoming signal channel, an outgoing signal channel, an array of "ferric" cells, means for scanning said cells sequentially at a predetermined rate, means for receiving a succession of signal elements over said incoming channel at a much slower rate than the rate at which said cells are scanned by said scanning means, means operated by said scanning means for reading the condition of said cells sequentially during each cycle of said scanning means, means responsive to the receipt of a signal element for recording during one scanning cycle the condition of said element in the cell next succeeding the cell in which the last signal element was recorded, means controlled by said scanning means for normally causing the condition of each cell read during one cycle of said scanning means to be rerecorded in the same cell during the same cycle, and means responsive to the receipt of the last one of a number of signal elements corresponding to the number of cells for applying signals read from said cells during one scanning cycle to said outgoing signal channel.

2. Electrical signal transmission equipment comprising an incoming signal channel, means for receiving a succession of groups of binary signal elements over said channel, the signal elements of each group being received element by element at a predetermined speed as either one or the other of two stable electrical conditions, signal element detecting means connected to said receiving means for detecting, element by element, which of the two said stable electrical conditions constitute said signal elements, means controlled by said signal element receiving means for producing an examining signal for each signal element received, a first set of "ferric" cells, a second set of "ferric" cells, the cells of said second set corresponding to those of said first set, scanning means for simultaneously scanning said first and second sets of "ferric" cells at a predetermined rate which is substantially faster than and independent of the rate at which said succession of groups of binary signal elements are received by said receiving means, first reading and writing means controlled by said scanning means for serially reading the condition of the cells of said second set of cells, once per scanning cycle, second reading and writing means controlled by said scanning means for serially reading the condition of the cells of said first set of cells, once per scanning cycle, control means operated by said first reading and writing means for normally causing said first and second reading and writing means to rerecord a predetermined condition read respectively from cells of said second and first sets back into the same cells, means responsive to said examining signal for altering said control means to cause said first reading and writing means to record a predetermined condition, read from a cell of said second set, in the next successive cell of said second set during one scanning cycle, said predetermined condition of a cell in said second set indicating that the condition of the next received signal element is to be recorded in the corresponding cell of said first set, and to cause said second reading and writing means to record during one scanning cycle the condition of the last-received signal element in the cell of the first set indicated by the previous cell of the second set in which said predetermined condition was recorded, detector means for determining at the beginning of a scanning cycle when said predetermined condition is in the last cell of said second set, and switching means under control of said detector means for transmitting the conditions read serially from the cells of said first set by said second reading and writing means during one scanning cycle.

References Cited in the file of this patent

UNITED STATES PATENTS

| | | |
|---|---|---|
| 2,540,654 | Cohen et al. | Feb. 6, 1951 |
| 2,695,397 | Anderson | Nov. 23, 1954 |
| 2,708,267 | Wiedenhammer | May 10, 1955 |
| 2,750,580 | Rabenda et al. | June 12, 1956 |
| 2,771,595 | Hendrickson et al. | Nov. 20, 1956 |
| 2,784,390 | Kun Li Chien | Mar. 5, 1957 |
| 2,785,388 | McWhirter | Mar. 12, 1957 |
| 2,802,203 | Stuart-Williams | Aug. 6, 1957 |
| 2,811,707 | Henning et al. | Oct. 29, 1957 |
| 2,960,683 | Gregory | Nov. 15, 1960 |

OTHER REFERENCES

"Static Magnetic Memory for Low Cost Circuits," Marshall Kincaid etc., Electronics, January 1951, pp. 108-111.